Dec. 20, 1927.
H. F. JOHNSON
1,653,211
DOUGH MOLDING MACHINE
Filed June 24, 1926    2 Sheets-Sheet 1
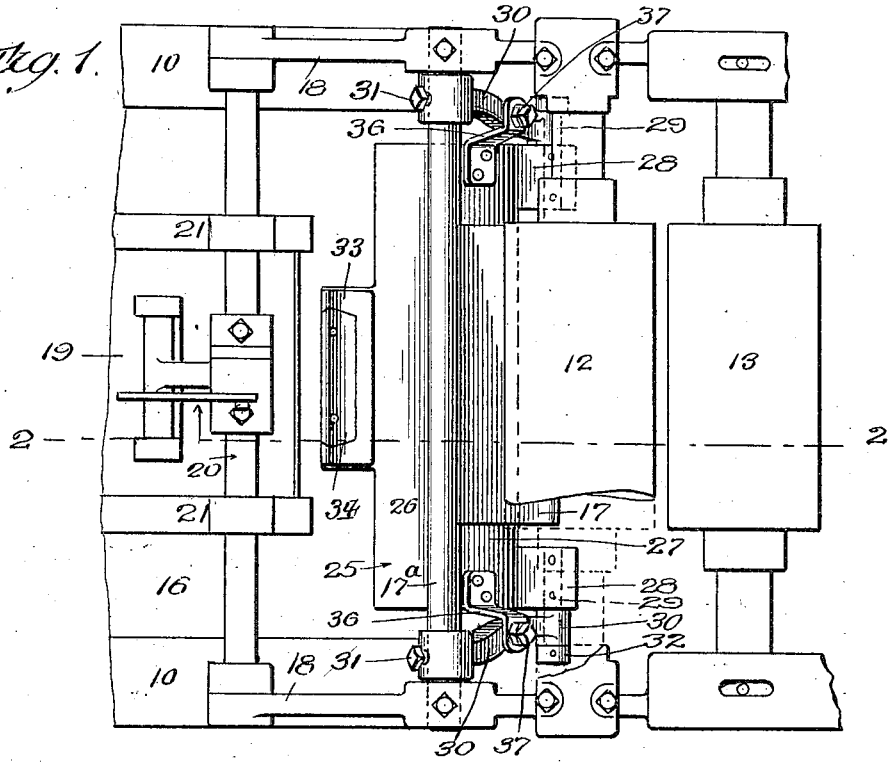
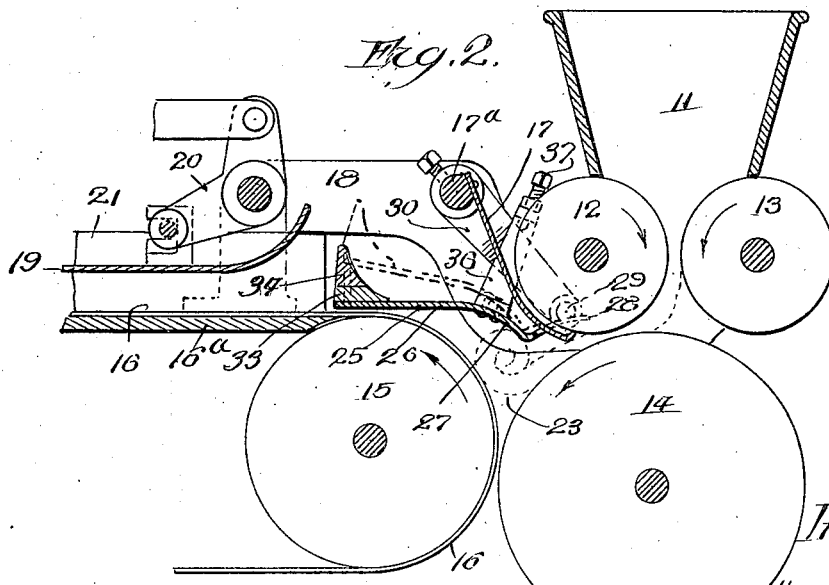

Dec. 20, 1927. 1,653,211
H. F. JOHNSON
DOUGH MOLDING MACHINE
Filed June 24, 1926 2 Sheets-Sheet 2
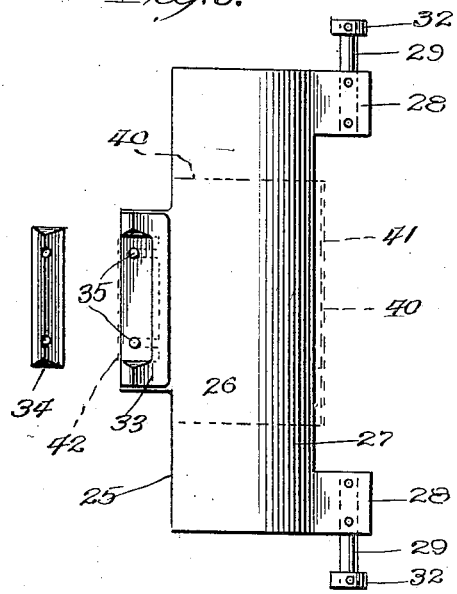
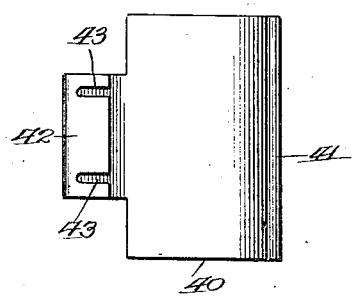
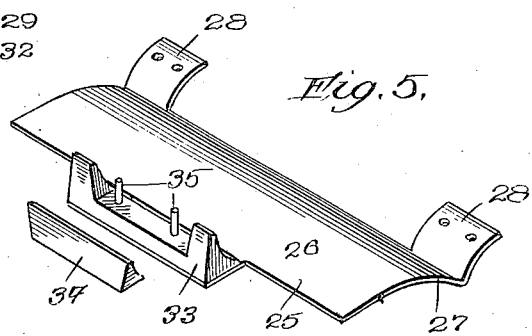
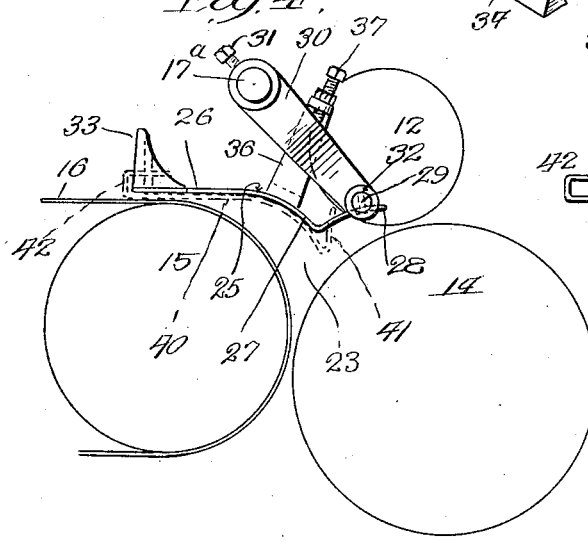

Patented Dec. 20, 1927.

1,653,211

UNITED STATES PATENT OFFICE.

HARVEY F. JOHNSON, OF JOLIET, ILLINOIS, ASSIGNOR TO UNION MACHINERY COMPANY, OF JOLIET, ILLINOIS, A CORPORATION OF ILLINOIS.

DOUGH-MOLDING MACHINE.

Application filed June 24, 1926. Serial No. 118,241.

This invention relates to curling devices for dough molding machines, and its principal object is to increase the efficiency of devices of this character and to insure more perfect results regardless of the size of the loaves and the kind of dough of which they are composed.

As is well understood by those skilled in the art to which this invention pertains, an operation in the manufacture of bread, buns and the like, by mechanical means, is that of molding into loaves the lumps of the dough which have been previously "rounded up" and "proofed". In the usual process of molding the lumps or dough into loaves, with dough molding machines, sheeting rolls are employed for flattening the lump or ball of dough into an elongated sheet, then curling or coiling the sheeted dough into a volute form and thereafter rolling the curled or coiled lump between pressure elements, where it is shaped, preparatory to receiving subsequent operations including that of baking the loaf.

Considerable difficulty has been incurred in dough molding machines, because of the failure of the curling devices to function successfully with all kinds of dough and all size of loaves, and the present curling device has been devised with a view towards overcoming this serious difficulty. The present invention consists in the several novel features hereinafter fully set forth and claimed.

The invention is clearly illustrated in the drawings accompanying this specification, in which:

Fig. 1 is a plan, partly broken away, of a dough molding machine embodying a simple form of the present invention; Fig. 2 is a vertical cross section thereof taken on the line 2—2 of Fig. 1; Fig. 3 is a plan of the curling device alone, showing a certain weight block detached from the main or body portion of the device; Fig. 4 is a side elevation of the curling device and certain adjacent parts; Fig. 5 is a perspective view of the curling device with the weight block detached; Fig. 6 is a plan of an auxiliary curling plate sometimes used in connection with the device and Fig. 7 is a side elevation of the auxiliary curling plate seen in Fig. 6.

Referring to said drawings, which illustrate one embodiment of the present invention, the reference characters 10, 10 designate fragments of the side frame members of a dough molding machine of common and well known type, a specimen of which is more fully shown and described in United States Letters Patent to Frank Streich No. 1,216,512 dated February 20, 1917, for improvements in dough molding machines. A machine of this type employs a feed hopper 11 into which the lumps of dough are delivered one at a time, a pair of feed rolls 12, 13 there below, a sheeting roll 14 below the feed rolls and a pulley 15 over which is a trained conveyor belt 16. The rolls and pulley are provided with suitable driving mechanism for rotating them in the directions indicated by the arrows thereon in Fig. 2. The dough, after it leaves the feed rolls, falls upon the sheeting roll and is fed forward between the feed roll and sheeting roll and flattened out into a relatively thin elongated sheet. A scraper 17 which engages with the feed roll 12 operates to disengage the sheeted dough from the roll 12 in case it adheres thereto. The scraper 17 is secured to and supported by a rod $17^a$, which extends across the top of the machine and is stationarily held in brackets 18 mounted on the frame members 10. The conveyor belt 16 travels upon a table $16^a$ and extends from the pulley 15 to another pulley at the discharge end of the machine, and above the conveyor belt is a pressure board 19 adjustably supported above the belt by a supporting device 20 carried by the side frame members 10. Side boards 21 are adjustably supported above the conveyor belt, and form together with said belt and pressure board, a rectangular conduit having a traveling bottom through which conduit the lumps of dough are propelled after having been sheeted and curled.

The sheeting roll 14 and pulley 15 with the conveyor belt 16 thereon, form a notched space 23 between the upper curved faces of the roll 14 and pulley 15, into which space the sheet of dough enters after the feed roll and sheeting roll have flattened the lump of dough, and in this notched space 23 the end of the sheeted dough encounters the conveyor belt 16, which belt operates to curl the sheet of dough in an upward and backward direction as is clearly illustrated by the dotted lines in Fig. 2. The top of the notched space 23 is covered by the curling device which forms the subject matter of this specification and will now be described in detail.

Referring now to Figs. 3 and 4 the body portion of the curling device will be seen to comprise a sheet metal member or plate 25 generally rectangular in form and having a flat part 26 and a downwardly curved part 27. The curved part is at least as long as the feed roll 12 and at the ends of the curved parts are projecting portions 28 which are located beyond the ends of the roll 12 and are secured to pivot pins 29. The pivot pins are rotatively mounted in the lower ends of supporting arms 30, the upper ends of which are formed with hub portions, which are placed upon the cross rod 17ª and rigidly secured in place by set screws 31. If desired the ends of the pivot pins 29 may have heads 32 secured upon their outer ends for engagement with the arms 30, thus preventing any movement of the curling device in a direction lengthwise of itself. The pivot pins 29 are located directly above the sheeting roll, and the curling device extends from said pivot pins over the notched space between the sheeting roll 14 and pulley 15. The curved part 27 of the curling device enters said notched space and the flat portion of the curling device extends from the curved portion thereof to a place above or slightly beyond the axis of the pulley 15. The free end of the curling device is provided with a weight, here shown in the form of a notched block of metal 33 secured to the upper side of the free end of the plate 25. The weight is provided with a supplemental weight block 34 which is arranged to fit in the notch of the main weight block 33, and pins 35 are provided in the notched weight block for engaging in holes of the auxiliary weight block 34. This arrangement provides means whereby the weight of the weighted end of the curling device may be increased or decreased as is found desirable with the various kinds of dough.

The curling device being pivotally supported upon the arms 30, it is free to be swung upward or downward within given limits and an adjustable device is provided for limiting the downward movement of it. Said adjusting means is shown to comprise brackets 36 secured upon the ends of the plate 25 and having set screws 37 threaded in their upper ends and arranged in contact with their upper sides of the arms 30. By properly adjusting the set screws 37 the curling device may be normally held in any desired spaced relation with respect to the top of the belt pulley 15.

In the operation of this curling device, the sheeted dough after passing the feed and sheeting roll engages with the conveyor belt 16 over the belt pulley 15 and is curled upward and backward into a coil. As soon as the coil becomes large enough in diameter to span the gap between the curved upper face of the belt and curved under face of the curling device it encounters the curved underside of the plate 25, and as the sheet of dough is fed forward, it is continuously curled or coiled between the conveyor belt and the underside of the curling device, and as its diameter increases, and it is moved along with the conveyor belt, it swings upward the curling device against the action of the weight thereof and passes on to the conduit between the conveyor belt, pressure board and side boards where it is propelled onward toward the discharge end of the machine.

The curling device being pivotally supported at a place adjacent the entrance to the notched space between the sheeting roll and pulley, the curling device is free to tilt or swing upward due to any upward pressure thereon by the curled up sheet of dough, and the weight of said curling device tends to place sufficient pressure on the dough to enable the traveling conveyor belt to curl the sheet up under the curling device and propel it along. The danger of the sheeted dough catching on the lower edge of the curling device is entirely eliminated since the curling device is free to swing upward in the direction in which the curl is traveling.

While the curling device hereinabove described in detail operates very successfully with large and small loaves of bread, the same molding machine is very often used for molding very small buns, or rolls, and in such cases I have found it desirable to provide an auxiliary curling plate 40 which is shown in Figs. 6 and 7 and in dotted lines in Figs. 3 and 4. The auxiliary curling plate is also preferably composed of sheet metal of substantially rectangular form and it conforms generally to the shape of the main curling plate but may be considerably narrower if desired and is arranged to be placed against the underside of the main curling plate. Its lower curled edge may be curved back upon itself in an upward direction as seen at 41 and its other end is bent upward and back upon itself to form a hook like end 42 which is formed with notches 43 that may receive the pins 35 of the notched weight block 33. The end portion 42 of the auxiliary curling plate is made of a width to fit in the notch of the notched weight block 33 and may be held in place by the auxiliary weight block 34 when placed upon the pins 35. With the use of the auxiliary curling plate the space between the belt pulley and curling device is narrowed up and may be narrowed up as much as may be desired to accommodate the smallest sized dough lump used in the formation of rolls or buns or the like.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. In a dough molding machine, the combination with a sheeting roll, a conveyor pulley adjacent thereto, and a conveyor belt trained over said pulley, said sheeting roll and conveyor pulley forming a crotched space between them, of curling plate supports, and a curling plate fulcrumed upon said supports at points adjacent the upper face of said sheeting roll, and extending from its points of support in a generally horizontal direction across the crotched space between said sheeting roll and conveyor pulley, and in the same direction as that traveled by the material acted upon, said curling plate being movable in a vertical direction at the crotched space over said conveyor pulley.

2. In a dough molding machine, the combination with a sheeting roll, a conveyor pulley adjacent thereto, and a conveyor belt trained over said pulley, of curling plate supports, a curling plate fulcrumed on said supports at points adjacent the upper face of said sheeting roll and extending across the space between said sheeting roll and conveyor pulley, and a weighted block on the free end of said curling plate, said curling plate being movable in a vertical direction over said conveyor pulley.

3. In a dough molding machine, the combination with a sheeting roll, a conveyor pulley adjacent therto, and a conveyor belt trained over said pulley, of curling plate supports, a curling plate fulcrumed on said supports at points adjacent the upper face of said sheeting roll and extending across the space between said sheeting roll and conveyor pulley, and a sectional weighted block on the free end of said curling plate, said curling plate being movable in a vertical direction over said conveyor pulley.

4. In a dough molding machine, the combination with feed rolls, a sheeting roll there below, a conveyor belt pulley and a conveyor belt trained over said pulley, said sheeting roll and conveyor belt pulley forming a crotched space between them, of a supporting rod, curling plate supporting arms secured to said rod and extending down beyond the ends of said feed rolls, and a curling plate having pivot pins fulcrumed on the lower ends of said arms at points adjacent the sheeting rolls, said curling plate extending from its points of support toward the discharge end and across the crotched space between the sheeting roll and conveyor pulley and overlying the part of said pulley which forms one side of the crotched space and being movable in a vertical direction over said pulley.

5. In a dough molding machine, the combination with a sheeting roll, a conveyor pulley adjacent thereto, and a conveyor belt trained over said pulley, said sheeting roll and conveyor pulley forming a crotched space between them, of curling plate supports, and a curling plate having pivot pins fulcrumed on said supports at points adjacent the upper face of said sheeting roll, said curling plate having a flat horizontal portion overlying the conveyor pulley and a downwardly curved portion projecting down into the crotched space between said sheeting roll and conveyor pulley, said curling plate extending from its points of support toward the discharge end of the machine and being movable vertically over said conveyor pulley.

6. In a dough molding machine, the combination with a sheeting roll, a conveyor pulley adjacent thereto, and a conveyor belt trained over said pulley, of curling plate supports, a curling plate having pivot pins fulcrumed on said supports at points adjacent the upper face of said sheeting roll, said curling plate having a flat portion overlying the conveyor belt pulley and a downwardly curved portion projecting down into the space between said sheeting roll and conveyor pulley, said curling plate being movable vertically over said conveyor belt pulley, and a weighted block secured upon the free end of said curling plate.

7. In a dough molding machine, the combination with a sheeting roll, a conveyor pulley adjacent thereto and a conveyor belt trained over said pulley, said sheeting roll and conveyor pulley forming a crotched space betwen them, of curling plate supporting arms, a curling plate having pivot pins fulcrumed on the ends of said arms and having a flat part overlying the conveyor pulley and a downwardly curved part entering the crotched space between the sheeting roll and conveyor pulley, said curling plate extending from its points of support in a direction toward the discharge end of the machine and being movable vertically over the conveyor pulley, and arms secured to said curling plate and having means arranged to engage said supporting arms to limit the downward movement of said curling plate.

8. In a dough molding machine, the combination with a sheeting roll, a conveyor pulley adjacent thereto and a conveyor belt trained over said pulley, of a main curling plate having a downwardly curved part, and being fulcrumed to swing vertically over said conveyor pulley, and a supplemental curling plate detachably secured to said main curling plate and having a part conforming to the underside thereof, and having a curved part extending farther into the space between the sheeting roll and the conveyor pulley than the curved part of the main curling plate.

9. In a dough molding machine, the combination with a sheeting roll, a conveyor pulley adjacent thereto and a conveyor belt trained over said pulley, of a main curling plate fulcrumed to move in a vertical direction over the conveyor pulley, and having a curved part extending down into the space between the sheeting roll and conveyor pulley, and an auxiliary curling plate having means for detachably connecting it with the main curling plate, said auxiliary curling plate extending underneath the main curling plate and having a curved portion extended farther down into the space between the sheeting roll and conveyor than the curved part of the main curling plate.

HARVEY F. JOHNSON.